United States Patent [19]
Kaiser et al.

[11] Patent Number: 5,359,286
[45] Date of Patent: Oct. 25, 1994

[54] SENSOR INCLUDING HALL ELEMENT, MOVABLE MAGNETIC BODY AND PERMANENT MAGNET FOR AUTOMATICALLY TRIGGERING SAFETY DEVICES IN MOTOR VEHICLES

[75] Inventors: Harry Kaiser, Markgröningen; Manfred Abendroth, Marbach/Neckar, both of Fed. Rep. of Germany

[73] Assignee: Robert Bosch GmbH, Stuttgart, Fed. Rep. of Germany

[21] Appl. No.: 862,548

[22] PCT Filed: Nov. 2, 1991

[86] PCT No.: PCT/DE91/00853
§ 371 Date: Jun. 19, 1992
§ 102(e) Date: Jun. 19, 1992

[87] PCT Pub. No.: WO92/08989
PCT Pub. Date: May 29, 1992

[30] Foreign Application Priority Data
Nov. 16, 1990 [DE] Fed. Rep. of Germany ....... 4036224

[51] Int. Cl.$^5$ .............. G01P 15/08; G01B 7/14; H01H 35/02; B60R 21/32
[52] U.S. Cl. ............... 324/207.2; 73/517 R; 73/DIG. 3; 200/61.45 R
[58] Field of Search ......... 324/207.20, 207.21, 324/251; 73/517 R, 517 A, DIG. 3; 200/61.45 R, 61.52, 61.45 M; 180/282; 280/734, 735; 340/429, 436, 467

[56] References Cited

U.S. PATENT DOCUMENTS

| | | | |
|---|---|---|---|
| 3,867,844 | 2/1975 | Shimizu et al. | 73/DIG. 3 X |
| 4,191,951 | 3/1980 | Fuzzell | 73/DIG. 3 X |
| 4,377,088 | 3/1983 | Evert | 324/207.2 X |
| 4,737,774 | 4/1988 | Chapman et al. | 73/DIG. 3 X |
| 4,803,426 | 2/1989 | Odagawa et al. | 324/207.2 X |
| 4,870,864 | 10/1989 | Io | 73/517 R |

FOREIGN PATENT DOCUMENTS

| | | |
|---|---|---|
| 0012325 | 6/1980 | European Pat. Off. |
| 0251069 | 7/1988 | European Pat. Off. |
| 3540947 | 5/1987 | Fed. Rep. of Germany |
| 8909177 | 11/1990 | Fed. Rep. of Germany |
| 2316977 | 4/1977 | France |
| 0163402 | 12/1980 | Japan ............ 324/207.2 |

*Primary Examiner*—Gerard R. Strecker
*Attorney, Agent, or Firm*—Michael J. Striker

[57] ABSTRACT

A sensor for automatically triggering safety devices in motor vehicles has a housing a having a recess, a body arranged in the housing so as to serve as a seismic mass and to trigger a control signal when a predetermined threshold value is exceeded, a permanent magnet enclosed by a region of magnetically nonconductive material, a Hall element arranged in the body in working connection with the permanent magnet and comprising magnetically conducting material. The Hall element substantially evaluates magnetic flux lines running parallel to a polarization direction of the permanent magnet, so that the Hall element evaluates the magnetic flux lines running parallel to the polarization direction of the permanent magnet in a basic position, and evaluates the magnetic flux lines running in an opposite direction in a tilting position.

10 Claims, 2 Drawing Sheets

SENSOR INCLUDING HALL ELEMENT, MOVABLE MAGNETIC BODY AND PERMANENT MAGNET FOR AUTOMATICALLY TRIGGERING SAFETY DEVICES IN MOTOR VEHICLES

BACKGROUND OF THE INVENTION

The present invention relates to a sensor.

More particularly, it relates to a sensor for automatically triggering safety devices in motor vehicles, with a housing and a body arranged in the housing and serving as a seismic mass so as to trigger a control signal when a predetermined threshold value is exceeded. Such a sensor in which a ball, serving as seismic mass, is arranged in the center of a socket with rising flanks is already known. The ball is deflected from this rest position either when a predetermined acceleration threshold is exceeded or when the motor vehicle is inclined at a predetermined angle. A reference light barrier is controlled by the rolling movement carried out by the ball and a measurement signal is accordingly generated. Further, it is known from DE-A1-35 40 947.9 to arrange an approximately cylindrical metal cylinder as seismic mass in the interior of a housing. A bore hole is constructed parallel to the axis in the seismic mass through which the light of a transmitter can reach a receiver in the basic position. If the seismic mass is tilted, the amount of light striking the receiver is reduced and a measurement signal is accordingly emitted. The center of gravity of the seismic mass is shifted with the aid of a recess constructed in the base of the seismic mass for influencing the triggering threshold. However, these sensors have the disadvantage that a relatively large tilting angle is necessary for obtaining an unequivocal measurement signal.

SUMMARY OF THE INVENTION

Accordingly, it is an object of the present invention to provide a sensor for automatically triggering safety devices in motor vehicles, which avoids the disadvantages of the prior art.

In keeping with these objects and with others which will become apparent hereinafter, one feature of the present invention resides, briefly stated, in a sensor, which has a permanent magnet enclosed by a region of magnetically nonconducting material and is in a working connection with a Hall element, is arranged in the body composed magnetically conductive material, wherein the Hall element substantially evaluates the magnetic flux lines running parallel to the polarization direction of the permanent magnet, so that the Hall element evaluates the magnetic flux lines running parallel to the polarization direction of the permanent magnet in the basic position and evaluates the magnetic flux lines running in the opposite direction in the tilting position.

When the sensor is designed in accordance with the present invention, it has the advantage of a simple and robust construction. Its operation can be constantly checked in the rest state so that its susceptibility to trouble and likelihood of failure are relatively low. Unequivocal switching points are provided by the reversal of the magnetic field in the tilted state. High tolerances of the switching points of the Hall sensor are possible within a large range of application temperatures from −40° to +125° C. The sensor triggers reliably since the field reversal causes the signal of the Hall switch to change from a relatively high measurement signal to a relatively low measurement signal. A reliable triggering of the sensor is also possible during the rotation of the sensor, i.e. when an overturning of a motor vehicle is detected. The sensor works so as to be virtually free of wear. Its simple design makes it suitable for series manufacturing. The response threshold can easily be adapted to different types of application by varying the seismic mass. It can be produced so as to have a long service life, operating and manufacturing reliability and a small construction so that it is suitable for use in electronic circuits. No balancing or adjusting work need be carried out in the manufacturing of the sensor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
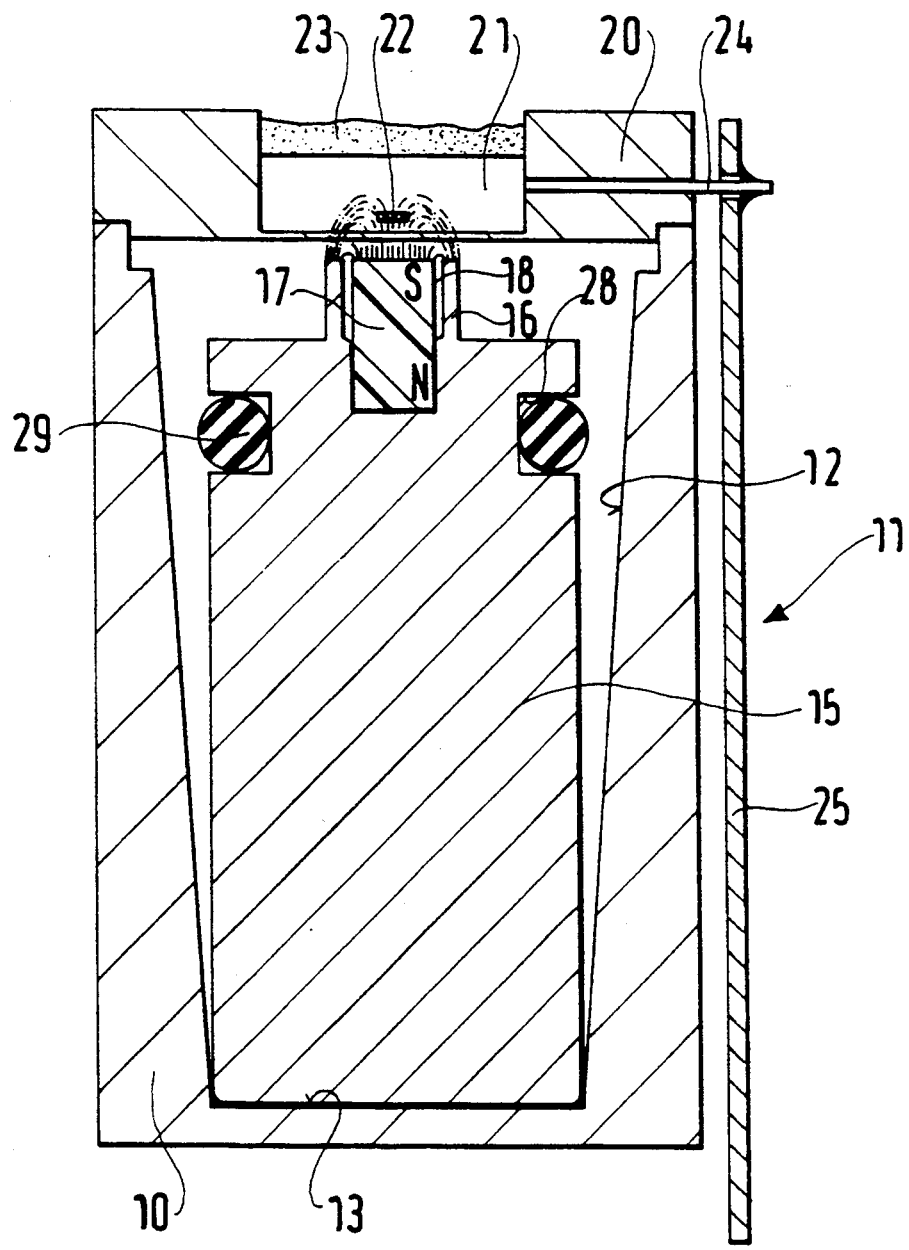
FIG. 1 shows a longitudinal section through a sensor triggering in all directions of a plane.

The approximately cup-shaped housing of a sensor 11 whose interior has side walls 12 with a constantly increasing angle α is designated in FIG. 1 by 10. The magnitude of the angle α is adapted to the maximum allowable hysteresis of the tilting angle. This tilting angle is determined by the triggering angle or the triggering acceleration of the sensor 11. An elongated body 15 which serves as seismic mass and is composed of magnetically conducting material contacts the base 13 of the interior with one front side. In particular, this elongated body 15 can be a square with a rectangular or square cross section (see FIG. 1) or a cylinder. The edges of the body 15 facing the base 13 are slightly rounded to enable a slight tilting of the body 15 in the interior of the housing 10. A hollow-cylindrical continuation 16 of the body 15 is constructed on the front side opposite the base 13, a permanent magnet 17 being inserted in its interior. The direction of polarization of the permanent magnet 17 is aligned in the axial direction of the body 15. The permanent magnet 17 and the continuation 16 terminate so as to be approximately flush. A narrow air gap 18 is located between the permanent magnet 17 and the inner wall of the continuation 16. The depth of the air gap 18 and accordingly the length of the continuation 16 corresponds approximately to half the axial length of the permanent magnet 17. Accordingly, one half of the permanent magnet 17 is located in the continuation 16 and the other half in the body 15.

The interior of the housing 10 is closed by a cover 20. A Hall switch 22 is arranged in a recess 21 of the cover 20 diametrically opposite the permanent magnet 17. This recess 21 is closed by a sealant 23 which protects the Hall switch 22 from environmental influences. The Hall switch 22 is connected with a connector plug, not shown, via a connection line 24 and a solder terminal 25 in a manner which is not shown in more detail. Further, an annular recess 28 is formed at the body 15 as close as possible to the region of the continuation 16, an elastic ring 29 being inserted into the recess 28. This elastic ring 29 serves for noise reduction to enable a relatively soft impact of the body 15 at the side wall 12 when the body 15 tilts.

In FIG. 1, the magnetic north pole of the permanent magnet 17 is embedded in the magnetically conductive body 15 which particularly comprises iron. However, it is conceivable to reverse the direction of polarization of the permanent magnet 17 depending on the type of Hall switch used. The magnetic flux runs from the north pole face of the permanent magnet 17 through the material of the body 15 into the continuation 16 and exits vertically from the latter and reenters into the south pole face of the permanent magnet 17 by a path through the air. The circularly running magnetic flux is obtained for an omnidirectional sensor 10, i.e. one triggering in all directions of a plane, by the sleeve-shaped construction of the continuation 16. The diameter of the permanent magnet 17 and the size of the Hall switch 22 are adapted to one another in such a way that only the magnetic flux lines opening into or proceeding from the front side of the permanent magnet 17 facing the Hall switch 22 run through the latter in the rest position of the sensor. This construction is further influenced by the width of the air gap 18. Instead of an air gap 18, this gap can also be filled with a magnetically nonconducting material. For a concentration of the magnetic field it is necessary that the front side of the continuation 16 and the front side of the permanent magnet 17 have the smallest possible construction.

When acceleration acts on the sensor 11 or when it is tilted at an angle, the body 15 likewise tilts so that the permanent magnet 17 is moved out of its basic position relative to the Hall switch 22. The magnetic field of the permanent magnet 17 is also shifted along with this tilting of the body 15. Accordingly, in the tilted state the Hall switch 22 is no longer penetrated by the magnetic flux lines in the region of the front side of the permanent magnet 17, but rather by the flux lines in the region of the front side of the continuation 16. Accordingly, the magnetic flux penetrates the Hall switch in the opposite direction compared to the untilted state. Only the tilting path of the body 15 need be large enough so that the Hall switch 22 must be located over the annular end face of the continuation 16 in the tilted state. This change of direction of the magnetic flux is explained by the assumption in physics that the magnetic flux lines run from the north to the south pole of the permanent magnet 17. Accordingly the magnetic flux lines emerging from the pole face of the continuation 16 are directed toward the Hall switch 22, while the flux lines in the region of the front side of the permanent magnet 17 would have the opposite direction, i.e. away from the Hall switch 22. Naturally, the flux density penetrating the Hall switch 22 in the tilted state is substantially less than in the rest position because of the division of the magnetic flux of the permanent magnet 17 on the entire circumferentially extending pole face of the continuation 16. An unequivocal measurement signal for which only a relatively small tilting path is necessary is accordingly obtained in a simple manner by this change in the flux density and simultaneously by the change in the direction of magnetic flux. Further, it is accordingly possible to use a less expensive unipolar Hall switch. Normally these inexpensive Hall switches have switching points with relatively great tolerances. These switching points are determined particularly by the required application temperature range of −40° to +125° C. However, the tolerance state of the switch-off point (release point) of the Hall switch has only a relatively slight effect because of the reversal of the magnetic field in the tilted state described in the preceding. It is only necessary to realize a sufficient flux density in the untilted state to ensure the switch-on point (operating point). If magnets of rare earth materials are used as permanent magnets 17, e.g. neodymium iron boron or cobalt samarium, a sufficiently strong magnetic field is always obtained if the chosen air gap for the Hall switch is not too large. The change in the magnetic field brought about by the tilting effects a change in the signal at the output of the Hall switch 22 from a relatively low value to a relatively high value. Accordingly, a safety device for protecting the passengers of a motor vehicle can be activated relatively reliably. Even when the sensor 11 rotates in an overturned position, the body 15 always contacts the side wall 12 of the housing 10 so that the permanent magnet 17 is located in the same position as in the tilted position described in the preceding. Accordingly the safety device is triggered in a compulsory manner in this position also.

Figure 2:
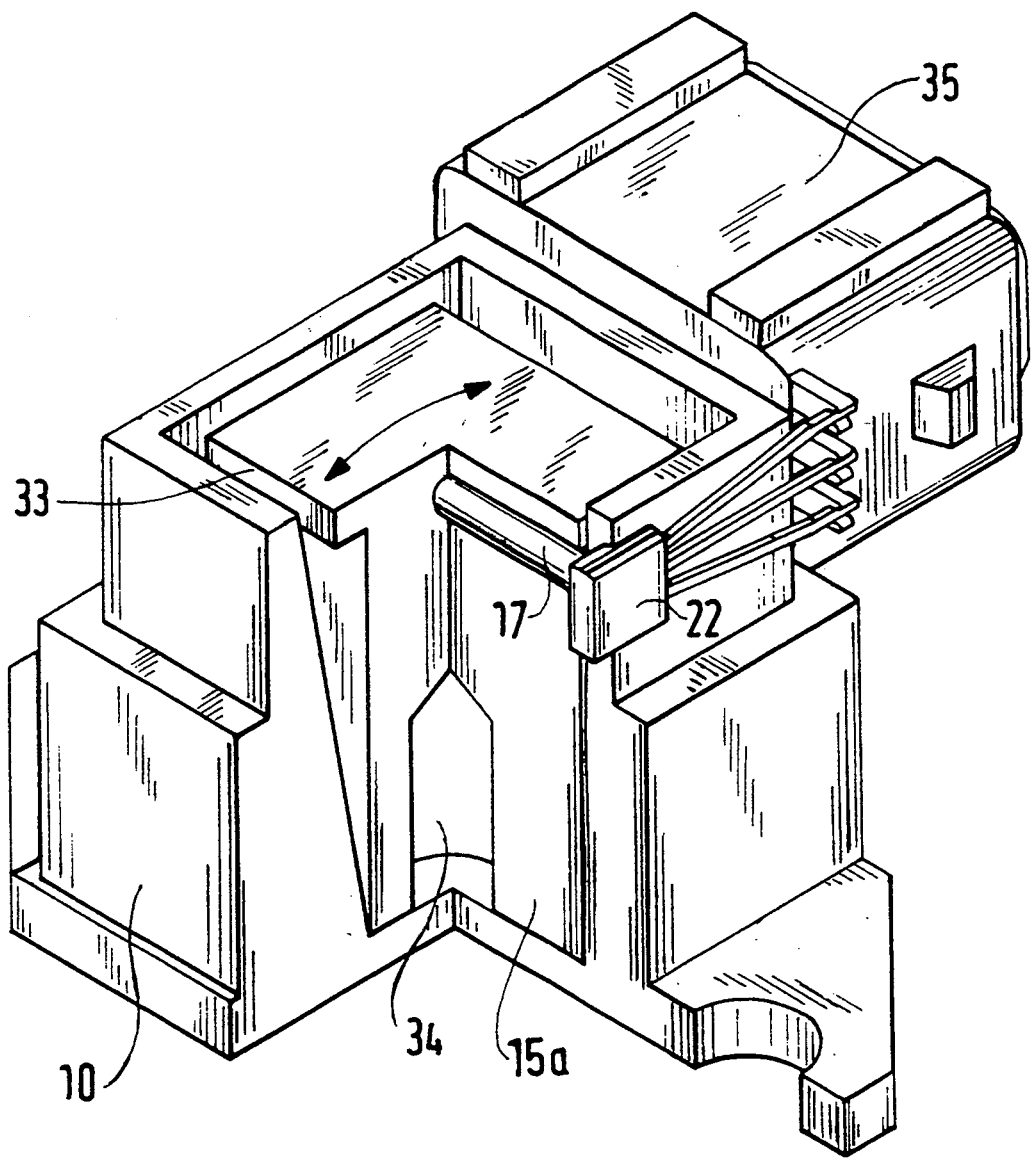
FIG. 2 shows a perspective view, partially broken away, of a sensor which triggers only in an axial direction.

FIG. 2 shows an acceleration switch which triggers only in one movement direction. The construction of the housing 10 corresponds to that of FIG. 1. To detect only one triggering direction, the permanent magnet 17 is arranged transversely relative to this triggering direction in the body 15a, i.e. it is located in a side wall of the body 15a. The design of the permanent magnet 17, the continuation 16 and accordingly that of the magnetic flux corresponds to the construction according to FIG. 1. For this reason, the Hall sensor 22a is not arranged in the cover, not shown in FIG. 2, but rather in the side wall of the housing 10 facing it. A stop 33 is constructed, e.g. by milling, at the upper end of the body 15a, i.e. in the region of the permanent magnet 17, at least on the two sides of the triggering direction. It is accordingly possible to maintain different switch-back points of the body 15a so as to move the body 15a out of the tilted position into the triggering position again. Further, a pocket bore hole 34 is introduced into the body 15a from the base to change the weight of the body 15a. The body 15a tilts sooner or later depending on the size of this bore hole 34. Further, the pocket bore hole 34 need not be constructed parallel to the axis of the body 15a. Depending on the direction in which it is displaced parallel to the axis of the body 15a, the body 15a tilts toward one side rather than toward the opposite side. Accordingly, it is possible to give one tilting direction a preferred weighting.

FIG. 2 also shows a three-pole connector plug 35 to which the solder terminal 25 of the Hall switch 22 is guided. This connector plug 35 can also be used in the construction according to FIG. 1.

It will be understood that each of the elements described above, or two or more together, may also find a useful application in other types of constructions differing from the types described above.

While the invention has been illustrated and described as embodied in a sensor for automatically triggering safety devices in motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A sensor for automatically triggering safety devices in motor vehicles, comprising a housing having a recess; a body arranged in said recess of said housing so as to serve as a seismic mass which under the action of outside force moves relative to said housing, said body being composed of magnetically conductive material; a cover member being attached to said housing and covering said recess; a Hall element located within one of said cover member and said body; a permanent magnet enclosed at least partially by a magnetically nonconductive region and arranged in the other of said cover member and said body opposite to and in working connection with said Hall element, said Hall element being penetrated by magnetic flux lines running parallel to a polarization direction of said permanent magnet in a basic position of said body, and being penetrated by magnetic flux lines running in an opposite direction in a tilting position of said body beyond a predetermined threshold value so as to trigger a control signal for automatically triggering a safety device of a motor vehicle.

2. A sensor as defined in claim 1, wherein said body and said permanent magnet are arranged relative to one another so that an air gap defining said region of magnetically nonconductive material is formed between said body and said permanent magnet at least along half a length of said permanent magnet.

3. A sensor as defined in claim 1, wherein said body has a continuation, said permanent magnet being arranged partly in said continuation of said body.

4. A sensor as defined in claim 3, wherein said continuation of said body is formed as a hollow cylinder.

5. A sensor as defined in claim 1, wherein said housing has inclined inner walls.

6. A sensor as defined in claim 1, wherein said body has a continuation, said permanent magnet having a front side which terminates so as to be flush with said continuation of said body.

7. A sensor as defined in claim 1, wherein said body is formed as a cylinder and has a front side which is remote of said permanent magnet and provided with a recess to reduce a weight of said body.

8. A sensor as defined in claim 1, wherein said body is formed as a square having a four-cornered base surface and an end side which is remote of said permanent magnet and provided with a recess to reduce a weight of said body.

9. A sensor as defined in claim 8, wherein said base surface of said body is rectangular.

10. A sensor as defined in claim 8, wherein said base surface of said body is square.

* * * * *